(12) United States Patent
Thunhorst et al.

(10) Patent No.: US 8,871,853 B2
(45) Date of Patent: Oct. 28, 2014

(54) RESIN SYSTEM COMPRISING DISPERSED MULTIMODAL SURFACE-MODIFIED NANOPARTICLES

(75) Inventors: Kristin L. Thunhorst, Stillwater, MN (US); Wendy L. Thompson, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/578,277

(22) PCT Filed: Feb. 9, 2011

(86) PCT No.: PCT/US2011/024147
§ 371 (c)(1),
(2), (4) Date: Aug. 10, 2012

(87) PCT Pub. No.: WO2011/100289
PCT Pub. Date: Aug. 18, 2011

(65) Prior Publication Data
US 2012/0309870 A1    Dec. 6, 2012

Related U.S. Application Data

(60) Provisional application No. 61/303,406, filed on Feb. 11, 2010.

(51) Int. Cl.
| | | |
|---|---|---|
| C08K 3/36 | (2006.01) | |
| C09D 7/12 | (2006.01) | |
| C08J 5/00 | (2006.01) | |
| B82Y 30/00 | (2011.01) | |
| C08K 9/02 | (2006.01) | |

(52) U.S. Cl.
CPC .............. C08J 5/005 (2013.01); C09D 7/1275 (2013.01); C08J 2363/00 (2013.01); C09D 7/1266 (2013.01); C08K 9/02 (2013.01); B82Y 30/00 (2013.01)
USPC ........... 524/493; 524/423; 524/430; 524/431; 524/432; 524/433; 524/434; 524/492

(58) Field of Classification Search
USPC ........................ 524/423, 430–434, 492–493
See application file for complete search history.

(56) References Cited

U.S. PATENT DOCUMENTS

| | | |
|---|---|---|
| 2,801,185 A | 6/1957 | Iler |
| 3,018,262 A | 1/1962 | Schroeder |
| 3,298,998 A | 1/1967 | Coover et al. |
| 3,562,223 A | 2/1971 | Bargain et al. |
| 3,627,780 A | 12/1971 | Bonnard et al. |
| 3,839,358 A | 10/1974 | Bargain |
| 4,046,734 A | 9/1977 | Zimmerli |
| 4,100,140 A | 7/1978 | Zahir et al. |
| 4,157,360 A | 6/1979 | Chung et al. |
| 4,181,752 A | 1/1980 | Martens et al. |
| 4,329,384 A | 5/1982 | Vesley et al. |
| 4,330,590 A | 5/1982 | Vesley |
| 4,379,201 A | 4/1983 | Heilmann et al. |
| 4,468,497 A | 8/1984 | Beckley et al. |
| 4,522,958 A | 6/1985 | Das et al. |
| 6,586,483 B2 | 7/2003 | Kolb et al. |
| 7,264,872 B2 * | 9/2007 | Walker et al. .................. 428/328 |
| 7,393,901 B1 | 7/2008 | Filiatrault et al. |
| 7,514,263 B2 | 4/2009 | Nelson et al. |
| 2003/0220204 A1 | 11/2003 | Baran et al. |
| 2006/0134362 A1 | 6/2006 | Lu et al. |
| 2007/0213449 A1 | 9/2007 | Lewandowski et al. |
| 2007/0232727 A1 * | 10/2007 | Lin et al. ........................ 523/440 |
| 2008/0153963 A1 | 6/2008 | Baran et al. |
| 2011/0097212 A1 | 4/2011 | Thompson et al. |

FOREIGN PATENT DOCUMENTS

| | | |
|---|---|---|
| DE | 10 259460 | 7/2004 |
| EP | 2 314 651 | 4/2011 |
| GB | 904177 | 8/1962 |
| WO | WO 02/062881 | 8/2002 |
| WO | WO 02/066571 | 8/2002 |
| WO | WO 03/044099 | * 5/2003 |
| WO | WO 2006/065373 | 6/2006 |
| WO | WO 2009/011278 | 1/2009 |
| WO | WO 2009/120868 | 10/2009 |
| WO | WO 2009/131920 | 10/2009 |
| WO | WO 2009/138471 | 11/2009 |
| WO | WO 2010/080459 | 7/2010 |
| WO | WO 2011/063217 | 5/2011 |

OTHER PUBLICATIONS

PCT International Search Report for PCT/US2011/024147 mailed Apr. 4, 2011, 3 pages.
Handbook of Thermoset Plastics (Second Edition), William Andrew Publishing, p. 122 (1998).
U.S. Appl. No. 61/181,052, James M. Nelson et al., filed May 26, 2009.
Epoxy Resins, Chemistry and Technology, Second Edition, edited by C. May, Marcel Dekker, Inc., New York, 1988.
Handbook of Epoxy Resins by Lee and Neville, McGraw-Hill Book Co., New York, 1967.
ASTM E122-09e1, "Standard Practice for Calculating Sample Size to Estimate, With Specified Precision, the Average for a Characteristic of a Lot of Process", 2009, 5 pages.
U.S. Appl. No. 61/303,406, Kristin L. Thunhorst et al., filed Feb. 11, 2010.
Liu G. et al., "Influence of nano-$SiO_2$ on properties of polyacrylate emulsion pressure sensitive adhesives", vol. 34, No. 7, 2006, pp. 73-76.

* cited by examiner

Primary Examiner — Peter Szekely

(57) ABSTRACT

Dispersions of nanoparticles in a resin component are described. The nanoparticles have a multimodal particle size distribution including at least a first mode and a second mode. The number average particle diameter of the particles in the first mode is greater than the number average particle size distribution in the second mode. The use of multimodal nanoparticle size distributions and the relative number of particles in the first and second mode to reduce or eliminate particle stacking behavior is also described.

16 Claims, 9 Drawing Sheets

US 8,871,853 B2

RESIN SYSTEM COMPRISING DISPERSED MULTIMODAL SURFACE-MODIFIED NANOPARTICLES

CROSS REFERENCE TO RELATED APPLICATIONS

This application is a national stage filing under 35 U.S.C. 371 of PCT/US2011/024147, filed Feb. 9, 2011, which claims priority to U.S. Provisional Patent Application No. 61/303,406, filed Feb. 11, 2010, the disclosures of which are incorporated by reference in their entirety herein.

FIELD

The present disclosure relates to surface-modified nanoparticles having a multimodal particle size distribution dispersed in a resin component.

SUMMARY

Briefly, in one aspect, the present disclosure provides a resin system comprising a resin component and surface-modified nanoparticles dispersed in the resin component. The surface-modified nanoparticles have a multimodal particle size distribution comprising a least a first mode and a second mode. The first mode has an average particle size of D1, wherein D1 is between 50 nanometers and 250 nanometers, inclusive, and a number of nanoparticles in the first mode, N1. The second mode has an average particle size, D2, wherein D2 is less than D1, and a number of nanoparticles in the second mode, N2. The ratio of D1 over D2 is greater than 1.5, and the ratio of N2 over N1 is greater than 0.5.

In some embodiments, D2 is less than 15 nanometers, and the ratio of N2 over N1 is greater than 1.5. In some embodiments, the ratio of D1 over D2 is greater than 10. In some embodiments, the ratio of N2 over N1 is between 1.5 and 100, inclusive.

In some embodiments, D2 is between 20 and 50 nanometers, inclusive. In some embodiments, D1 is between 60 and 100 nm, inclusive, e.g., between 60 and 80 nm, inclusive. In some embodiments, the ratio of D1 over D2 is between 2 and 3. In some embodiments, the ratio of N2 over N1 is between 1 and 2, inclusive.

In some embodiments, the resin component has a complex viscosity of less than 100 Pa·s at 30° C., e.g., less than 10 Pa·s at 30° C., e.g., less than 5 Pa·s at 30° C., as measured according to the Rheology Test Procedure. In some embodiments, the resin system comprises at least 30 wt. %, e.g., at least 40 wt. %, e.g., at least 45 wt. % nanoparticles based on the total weight of the resin component and the nanoparticles, and a dispersion of the nanoparticles in the resin component has a complex viscosity of less than 60 Pa·s at 30° C., e.g., less than 40 Pa·s at 30° C., less than 30 Pa·s at 30° C., as measured according to the Rheology Test Procedure.

In some embodiments, the resin component comprises a curable resin. In some embodiments, the curable resin comprises an epoxy resin. In some embodiments, the resin component further comprises a reactive diluent.

In some embodiments, the nanoparticles comprise nanoparticles having a core with a silica surface. In some embodiments, the nanoparticles comprise at least one surface modifying agent comprising a first group covalently bonded to the silica surface and a second group reactive with at least one constituent of the resin component. In some embodiments, the resin system comprises less than 0.5 percent by weight solvent.

In another aspect, the present disclosure provides an article comprising the resin system according to any of the preceding claims, wherein the resin system is cured. In some embodiments, the article is a composite comprising fibers impregnated with the resin system. In some embodiments, the resin system is a coating on a surface of a substrate.

The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1A:
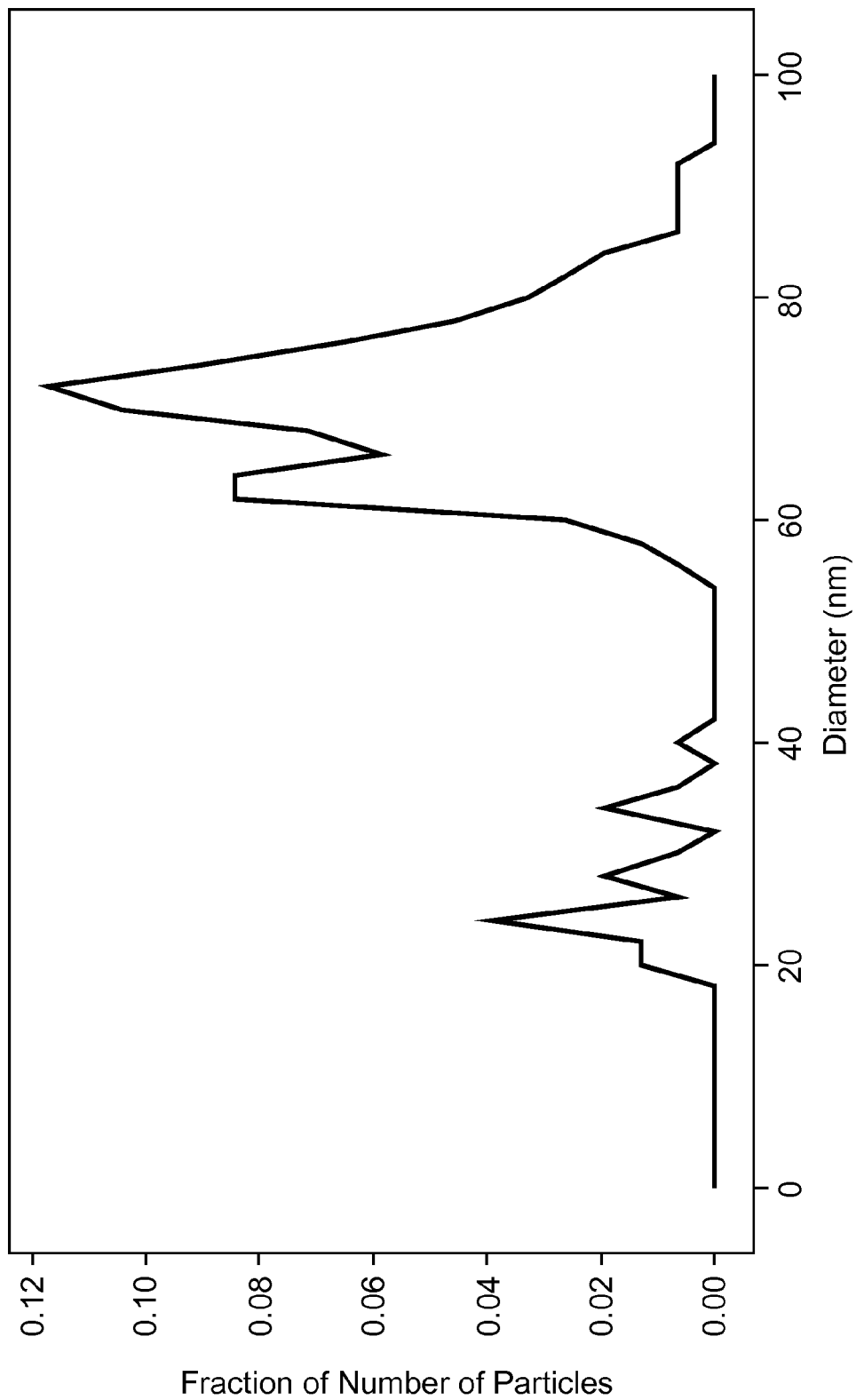
FIG. 1A is a number fraction size distribution of the NP-D1-A nanoparticles.

Generally, resin systems are used in a wide variety of applications, e.g., as protective layers (e.g., gel coats and coatings) and as the impregnation resin in composites (e.g., fibrous composites). Resin systems are often selected based on the desired mechanical properties of the final product including, e.g., hardness, toughness, fracture resistance, and the like. In some applications, the optical appearance of the finished product may be important such that properties like clarity and haze must be considered. In addition, process conditions may lead to preferred ranges of properties affecting processability such as viscosity. Finally, the desired end use of the product often leads to additional requirements, e.g., erosion resistance or anti-blistering.

Thermoplastic resins have been used in a variety of applications. However, in many applications (e.g., fiber composites), curable resins (e.g., crosslinkable resins) are preferred. In general, when cured, the thermal and mechanical properties of curable resins tend to be superior to the thermal and mechanical properties obtainable with a thermoplastic resin.

Surface-modified nanoparticles have been added to resins, including curable resins, to achieve resin systems exhibiting improved mechanical properties. However, in many cases high particle loadings, e.g., greater than 15 weight percent (15 wt. %) nanoparticles based on the total weight of the resin system may be required to achieve the desired improvements.

For example, in some embodiments, particle loadings of at least 25 wt. %, at least 35 wt. %, or even higher may be desirable.

Although high particle loadings can be useful to achieve desired mechanical properties, the addition of high levels of nanoparticles can have a detrimental affect on the rheology of the particle-loaded resin system. For example, at high loadings, the viscosity of a resin system can become excessively high, even to the point of becoming gel-like. In addition, the presence of nanoparticles can lead to viscosity increases with increases in temperature, shear rate, or both.

It is well-known that the smaller the nanoparticle size, the lower the particle loading must be to avoid excessive viscosity build. Contrary to this general understanding, the present inventors have discovered that a surprising and significant reduction, or even elimination, of viscosity build, particularly at high shear rates, can be achieved by adding smaller nanoparticles to a resin system loaded with larger nanoparticles. That is, by proper selection of the relative particle sizes and loadings, multimodal nanoparticle size distributions can be selected to achieve the desired high particle loading without the detrimental effects on viscosity and handling.

Resin System.

As used herein, the term "resin system" refers to the combination of the surface-modified nanoparticles, the resin component, and any additional elements such as hardeners, curatives, initiators, promoters, crosslinking agents, tougheners, and fillers. As used herein, the term "resin component" refers collectively to resins and reactive diluents.

Resins.

Generally, any known resin may be used in the various embodiments of the present disclosure. In some embodiments, a curable resin may be preferred. Generally, any known curable resin may be used including, e.g., thermally curable, radiation curable, moisture curable, and diffusible agent curable resins. Useful curing mechanisms include cationic cure, anionic cure, addition cure, and free-radical cure. In some embodiments, higher glass transition temperature (Tg) "glassy" resins may be used, e.g., resins having a Tg of greater than 50° C. after curing. Prior to curing, the curable resins may be present as monomers and/or prepolymers (e.g., oligomers).

Suitable resins include, e.g., epoxy resins, unsaturated polyester resins, bismalimides resins, cyanate ester resins, vinyl ester resins, acrylic resins, urethane resins, and urethane acrylate resins. In some embodiments, polyepoxide resins, including aliphatic and aromatic polyepoxide resins, may be used.

Epoxy resins are well-known in the art and comprise compounds or mixtures of compounds which contain one or more epoxy groups. The compounds can be saturated or unsaturated, aliphatic, alicylic, aromatic, or heterocyclic, or can comprise combinations thereof. In some embodiments, compounds which contain more than one epoxy group (i.e., polyepoxides) are preferred.

Polyepoxides which can be used include, e.g., both aliphatic and aromatic polyepoxides, but aromatic polyepoxides may be preferred for high temperature applications. The aromatic polyepoxides are compounds containing at least one aromatic ring structure, e.g. a benzene ring, and more than one epoxy group. Exemplary aromatic polyepoxides include the polyglycidyl ethers of polyhydric phenols (e.g., bisphenol A derivative resins, epoxy cresol-novolac resins, bisphenol F derivative resins, epoxy phenol-novolac resins), glycidyl esters of aromatic carboxylic acids, and glycidyl amines of aromatic amines. Exemplary epoxy resins include those based on bisphenol A and bisphenol F, e.g., those available under the trade name EPON™ from Hexion Specialty Chemicals, Inc., Houston, Tex.

In some embodiments, the curable resin may be an ethylenically-unsaturated curable resin. For example, in some embodiments, an unsaturated polyester resin may be used. In some embodiments, the unsaturated polyester resin is the condensation product of one or more carboxylic acids or derivatives thereof (e.g., anhydrides and esters) with one or more alcohols (e.g., polyhydric alcohols).

In other embodiments, vinyl ester resins may be used. As used herein, the term "vinyl ester" refers to the reaction product of epoxy resins with ethylenically-unsaturated monocarboxylic acids. Exemplary epoxy resins include bisphenol A digycidal ether (e.g., EPON 828, available from Hexion Specialty Chemicals, Columbus, Ohio). Exemplary monocarboxylic acids include acrylic acid and methacrylic acid. Although such reaction products are acrylic or methacrylic esters, the term "vinyl ester" is used consistently in the gel coat industry. (See, e.g., Handbook of Thermoset Plastics (Second Edition), William Andrew Publishing, page 122 (1998).)

In still other embodiments, (meth)acrylate resins, including, e.g., urethane (meth)acrylates, polyethyleneglycol (multi)(meth)acrylates, and epoxy (multi)(meth)acrylates may be used. As used herein, the term (meth)acrylate refers to an acrylate and/or a methacrylate, i.e., ethyl (meth)acrylate refers to ethyl acrylate and/or ethyl methacrylate.

Reactive Diluents.

Depending on the selection of the curable resin, in some embodiments, the resin system may also include a reactive diluent. Exemplary reactive diluents include styrene, alpha-methylstyrene, vinyl toluene, divinylbenzene, triallyl cyanurate, methyl methacrylate, diallyl phthalate, ethylene glycol dimethacrylate, hydroxyethyl methacrylate, hydroxyethyl acrylate, and other mono- and multi-functional (meth)acrylates.

Reactive diluents for epoxy resins include mono- and multi-functional, aliphatic and aromatic, glycidyl ethers including, e.g., those available under the trade name HELOXY from Hexion Specialty Chemicals, Columbus, Ohio. Exemplary reactive diluents include, e.g., trimethyol propane trigylcidyl ether, 1,4-butane diol diglycidyl ether, neopentyl glycol diglycidyl ether, n-butyl glycidyl ether, 2-ethylhexyl glycidyl ether, p-tertiary butyl phenyl glycidyl ether, phenyl glycidyl ether, and cyclohexane dimethanol diglycidyl ether.

Surface Modified Nanoparticles.

Generally, "surface modified nanoparticles" comprise surface treatment agents attached to the surface of a core. In some embodiments, the core is substantially spherical. In some embodiments, the cores are relatively uniform in primary particle size. In some embodiments, the cores have a narrow particle size distribution. In some embodiments, the core is substantially fully condensed. In some embodiments, the core is amorphous. In some embodiments, the core is isotropic. In some embodiments, the core is at least partially crystalline. In some embodiments, the core is substantially crystalline. In some embodiments, the particles are substantially non-agglomerated. In some embodiments, the particles are substantially non-aggregated in contrast to, for example, fumed or pyrogenic silica.

As used herein, "agglomerated" is descriptive of a weak association of primary particles usually held together by charge or polarity. Agglomerated particles can typically be broken down into smaller entities by, for example, shearing forces encountered during dispersion of the agglomerated particles in a liquid.

In general, "aggregated" and "aggregates" are descriptive of a strong association of primary particles often bound together by, for example, residual chemical treatment, covalent chemical bonds, or ionic chemical bonds. Further breakdown of the aggregates into smaller entities is very difficult to achieve. Typically, aggregated particles are not broken down into smaller entities by, for example, shearing forces encountered during dispersion of the aggregated particles in a liquid.

As used herein, the term "silica nanoparticle" refers to a nanoparticle having a core with a silica surface. This includes nanoparticle cores that are substantially entirely silica, as well as nanoparticle cores comprising other inorganic (e.g., metal oxide) or organic cores having a silica surface. In some embodiments, the core comprises a metal oxide. Any known metal oxide may be used. Exemplary metal oxides include silica, titania, alumina, zirconia, vanadia, chromia, antimony oxide, tin oxide, zinc oxide, ceria, and mixtures thereof. In some embodiments, the core comprises a non-metal oxide.

Commercially available silicas include those available from Nalco Chemical Company, Naperville, Ill. (for example, NALCO 1040, 1042, 1050, 1060, 2326, 2327 and 2329); Nissan Chemical America Company, Houston, Tex. (e.g., SNOWTEX-ZL, -OL, -O, -N, -C, -20L, -40, and -50); and Admatechs Co., Ltd., Japan (for example, SX009-MIE, SX009-MIF, SC1050-MJM, and SC1050-MLV).

Surface Treatment Agents.

The nanoparticles used in the present disclosure are surface treated. Generally, surface treatment agents for silica nanoparticles are organic species having a first functional group capable of covalently chemically attaching to the surface of a nanoparticle, wherein the attached surface treatment agent alters one or more properties of the nanoparticle. In some embodiments, surface treatment agents have no more than three functional groups for attaching to the core. In some embodiments, the surface treatment agents have a low molecular weight, e.g. a weight average molecular weight less than 1000 gm/mole.

In some embodiments, the surface treatment agent further includes one or more additional functional groups providing one or more additional desired properties. For example, in some embodiments, an additional functional group may be selected to provide a desired degree of compatibility between the surface modified nanoparticles and one or more of the additional constituents of the resin system, e.g., one or more of the curable resins and/or reactive diluents. In some embodiments, an additional functional group may be selected to modify the rheology of the resin system, e.g., to increase or decrease the viscosity, or to provide non-Newtonian rheological behavior, e.g., thixotropy (shear-thinning).

In some embodiments, the surface-modified nanoparticles are reactive; that is, at least one of the surface treatment agents used to surface modify the nanoparticles of the present disclosure may include a second functional group capable of reacting with one or more of the curable resin(s) and/or one or more of the reactive diluent(s) of the resin system. For purposes of clarity, even when the nanoparticles are reactive, they are not considered to be constituents of the resin component of the resins system.

Surface treatment agents often include more than one first functional group capable of attaching to the surface of a nanoparticle. For example, alkoxy groups are common first functional groups that are capable of reacting with free silanol groups on the surface of a silica nanoparticle forming a covalent bond between the surface treatment agent and the silica surface. Examples of surface treatment agents having multiple alkoxy groups include trialkoxy alkylsilanes (e.g., 3-(trimethoxysilyl)propyl methacrylate) and trialkoxy arylsilanes (e.g., trimethoxy phenyl silane).

Multimodal Particle Size Distributions.

Although other methods such as titration and light scattering techniques may be used, the particle size measurements of the present disclosure are based on transmission electron microscopy (TEM). Using this technique, TEM images of the nanoparticles are collected, and image analysis is used to determine the particle size of each particle. A count-based particle size distribution is then determined by counting the number of particles having a particle size falling within each of a number of predetermined discrete particle size ranges. The number average particle size in a mode can then be calculated.

In the present disclosure, the nanoparticles are selected to achieve a multimodal particle size distribution. Generally, a multimodal distribution is distribution having two or more modes, i.e., a bimodal distribution exhibits two modes, while a trimodal distribution exhibits three modes.

In some embodiments, the multimodal distribution of the surface-modified nanoparticles has a first mode (as determined by TEM) having a number average particle size of between 50 and 250 nanometers (nm), inclusive. In some embodiments, the average particle size of the first mode is at least 50 nm, at least 60 nm, or even at least 70 nm. In some embodiments, the average particle size of the first mode ("D1") is no greater than 150 nm, e.g., no greater than 100 nm, or even no greater than 80 nm.

The multimodal distributions of the surface-modified nanoparticles of the present disclosure also have a second mode. The number average diameter of the nanoparticles in the second mode is less than the average diameter of the nanoparticles in the first mode. In some embodiments, the average particle size of the second mode, D2, is no greater than 50 nm, e.g., no greater than 30 nm, no greater than 20 nm, no greater than 15 nm, or even no greater than 10 nm. In some embodiments, D2 is at least 3 nm, e.g., at least 5 nm, e.g., at least 10 nm, or even at least 20 nm. In some embodiments, D2 is between 3 and 10 nm, inclusive. In some embodiments, D2 is between 20 and 50 nm, inclusive.

For trimodal and higher modal distributions, the first and second modes are taken to be the two modes having the greatest percent by number of particles within their distributions. The following descriptions then apply to bimodal distributions, as well as trimodal and higher modal distributions.

As described herein, the first and second modes are defined relative to each other such that the number average particle size of the first mode, D1, is greater than the number average particle size of the second mode, D2. In some embodiments, the ratio of the average particle size of the first mode to the average particle size of the second mode, D1:D2, is at least 1.5:1. In some embodiments, D1:D2 is at least 2:1, at least 4:1, or even at least 10:1. Generally, the ratio of D1:D2 is no greater than 20:1. In some embodiments, the ratio of D1:D2 is no greater than 15:1, e.g., no greater than 8:1, no greater than 5:1, or even no greater than 3:1. In some embodiments, the ratio of D1:D2 is between 1.5:1 and 4:1, e.g., between 2:1 and 3:1. In some embodiments, the ratio of D1:D2 is between 10:1 and 20:1.

As used herein, the weight percent of nanoparticles in the resin system is based on all nanoparticles present in the resins system regardless of the number of modes in the nanoparticle size distribution. Generally, the percent by weight of nanoparticles is based on the combined weight of the resin component and the nanoparticles in the resin system, and is no greater than 60 wt. %. In some embodiments, the nanoparticles are present at no greater than 55 wt. %, e.g., no greater than 50 wt. %. In some embodiments, the resin system contains at least 25 wt. %, e.g., at least 30 wt. %, or even at least 40 wt. % of nanoparticles.

As used herein, the number fraction of smaller nanoparticles relative to larger nanoparticles is based on the total number of nanoparticles in the first mode and the second mode. That is, for trimodal and higher modal distributions, only the nanoparticles in the first and second mode are considered. In addition, even for bimodal distributions, a lot of nanoparticles may contain some fraction of nanoparticles that have sizes falling outside the range of nanoparticle sizes falling within either of the modes. These particles are also excluded from the calculation of the number fraction of smaller nanoparticles relative to larger nanoparticles.

The number fraction of the nanoparticles is based on the total number of nanoparticles in the first mode, N1, and the total number of nanoparticles in the second mode, N2. That is, the number fraction of nanoparticles is based on the number of nanoparticles in both modes of a bimodal distribution, or only the two modes of a tri- or higher modal distributions that contain the greatest number of nanoparticles. Thus, the number fraction of particles in the first mode is defined as $$NF1=N1/(N1+N2) \quad (1)$$

while the number fraction of particles in the second mode is defined as $$NF2=N2/(N1+N2). \quad (2)$$

Generally, the number fraction of the smaller nanoparticles, NF2, i.e., the number fraction of the nanoparticles in the second mode having the smaller average particle size of D2, is approximately equal to, and, in some embodiments, no less than the number fraction of the larger nanoparticles, NF1, i.e., the number fraction of the nanoparticles in the first mode having the larger average particle size of D1.

The ratio of the number fraction of the smaller particles, NF2, over the number fraction of the larger particles, NF1, is equal to the ratio of the number of smaller particles over the number of larger particles. i.e., $$NF2/NF1=(N2/(N1+N2))/(N1/(N1+N2)=N2/N1 \quad (3)$$

The present inventors have observed that the viscosity of a nanoparticle-containing resin system generally decreases with increasing temperature. This is generally consistent with the understanding that the viscosity of the resin itself decreases with increasing temperature. However, with some nanoparticle-filled resin systems, the present inventors further discovered that, after an initial reduction in viscosity with increasing temperature, there can be a surprising increase in the viscosity of a nanoparticle-containing resin system with further increases in temperature. That is, as the viscosity of the resin itself is reduced by increasing the temperature, a point is reached where the presence of the nanoparticles results in a new rheological behavior leading to an increase in the overall viscosity of the nanoparticle-containing resin system. As used herein, the term "particle stacking" will be used to describe this new rheological phenomenon.

The tendency for a nanoparticle-containing resin to exhibit particle stacking is particularly exacerbated in low viscosity resins. A low viscosity resin is defined as one having a complex viscosity at 30° C. of less than 10,000 Pascal·seconds (Pa·s), as measured by the Rheology Test Procedure. In some embodiments, a low viscosity resin may have complex viscosity at 30° C. of less than 1000 Pa·s, less than 10 Pa·s, or even less than 1 Pa·s, as measured by the Rheology Test Procedure. In contrast, the presence and tendency of particle stacking behavior is significantly suppressed in higher viscosity resins, such as those which are appropriate in prepreg composite applications. Resin systems typically used in prepreg formation applications may have a complex viscosity at 30° C. of greater than 10,000 Pa·s, e.g., between 10,000 and 100,000 Pa·s, as measured by the Rheology Test Procedure.

The total concentration of nanoparticles, especially in a mono-modal composition, in a resin also affects the tendency for the particle stacking behavior to exist. At lower concentrations of nanoparticles, the stacking behavior can be reduced and/or eliminated. However, the reduction in nanoparticle concentration needed to eliminate the particle stacking behavior may be so great that the desired improvements in the thermal and/or mechanical properties of the resulting nanoparticle-containing resin system can not be achieved.

The present inventors have discovered that the particle stacking behavior can be reduced or even eliminated by using a bimodal or higher order distribution of nanoparticles, while maintaining the desired high particle loadings. Generally, the desired ratio of smaller particles to larger particles (N2/N1) will depend on the ratio of the diameter of the larger particles over the diameter of the smaller particles (D1/D2). The lower limit for the ratio of N2/N1 is typically set by the minimum ratio necessary to eliminate the undesirable particle stacking behavior (i.e., the increase in viscosity with increasing temperature, or decreasing base resin viscosity). An upper limit for the ratio of N2/N1 can arise when the presence of the smaller particles leads to an undesired increase in the complex viscosity at 30° C., a parameter associated with processability and handleability of a resin system.

In some embodiments, N2/N1 at least 0.5 e.g., at least 0.8., at least 0.9, or even at least 1. In some embodiments, NF2/NF1 may be at least 1.5, e.g., at least 1.7. In some embodiments, NF2/NF1 is no greater than 100, e.g., no greater than 90. In some embodiments, N2/N1 is no greater than 3, e.g., no greater than 2, or even no greater than 1.5. In some embodiments, the ratio if N2/N1 is between 1.5 and 100, inclusive, e.g., between 1.8 and 90, inclusive. In some embodiments, the ratio of N2/N1 is between 0.5 and 2 inclusive, e.g., between 0.8 and 2, inclusive, or even between 1 and 2, inclusive.

In some embodiments, the resin systems of the present disclosure may be cured. In some embodiments, the curable resin is crosslinked. Any known crosslinking method may be used including exposure to thermal energy or actinic radiation (e.g., ultraviolet light and electron beam radiation). In some embodiments, the resin systems may include a curing agent. Generally, one of ordinary skill in the art can select an appropriate curing agent based on, e.g., the nature of the curable resin, the desired method of curing (e.g., thermal or actinic radiation), the temperature of cure, and the desired curing time. Exemplary curing agents for epoxy resins include, e.g., amines and anhydrides.

In some embodiments, the curable resin may also react with the surface-modifying agent. For example, in some embodiments, a reactive group of the surface-modifying agent may react with, e.g., covalently bond with, the curable resin.

Various embodiments of the compositions of the present disclosure may be used in a wide variety of applications. In some embodiments, the compositions may be applied to a surface of an article e.g., as a coating on wind turbine blades and as gel coats on, e.g., vehicles, e.g., boats. Such coatings may be cured, e.g., crosslinked.

In some embodiments, the compositions of the present disclosure may be used to form fibrous composites including composites used in the manufacture of, e.g., sporting goods (e.g., rackets, fishing poles, hockey sticks, baseball bats, sailing masts, and the like); wind turbine blades, as well as the spars, and spar caps in wind turbine blades; satellites, and vehicles and vehicle parts including automobiles, ships, aircraft, and space vehicles. For example, in some embodiments, reinforcing fibers may be impregnated with the composition to form a composite article.

Composites may be formed using any known means including, e.g., resin transfer molding (RTM), filament winding, tow placement, resin infusion processes, pultrusion process, or traditional prepreg processes. The resin may then be cured using any known means including exposure to thermal energy and/or actinic radiation.

Generally, any fibers suitable for use in fibrous composites may be used. Exemplary fibers include carbon fibers, glass fibers, ceramic fibers, boron fibers, silicon carbide fibers, polyimide fibers, polyamide fibers, and polyethylene fibers. Combinations of materials may also be used. Generally, the form of the fibers is not particularly limited. Exemplary fiber forms include unidirectional array of individual continuous fibers, woven fabric, knitted fabric, yarn, roving, braided constructions and non-woven mat.

Test Methods.

Gas Chromatography (GC) Procedure.

Gas chromatography was used to analyze for residual solvents. Gas chromatography was run using an AGILENT 6890N gas chromatograph equipped with an HP-5MS column ((5% phenyl)-methylpolysiloxane having a length of 30 meters and an inside diameter of 320 micrometers (both the chromatograph and column are available from Agilent Technologies, Incorporated, Santa Clara, Calif.)). The following parameters were employed: a 1 microliter aliquot of a 10% sample solution (in GC grade Acetone) was injected; split inlet mode set at 250° C., 9.52 psi and a total inlet flow of 111 mL/min; column constant pressure mode set at 9.52 psi; velocity was set at 34 centimeters/second; total gas flow was 2.1 mL/min; detector and injector temperatures were 250° C.; and a temperature sequence of equilibration at 40° C. for 5 minutes followed by a ramp rate of 20° C./minute to 260° C. A thermoconductivity detector was used.

Transmission Electron Microscopy Procedure.

Particle size and particle size distribution measurements were made using Transmission Electron Microscopy (TEM). To measure the particle size and particle size distribution, the as-supplied nanoparticle sols were diluted by taking 1 or 2 drops of sol and mixing it with 20 mL of deionized distilled water. The diluted samples were sonicated (Ultrasonic Cleaner, Mettler Electronics Corp., Anaheim, Calif.) for 10 minutes and a drop of the diluted sample was placed on a 200 mesh Cu TEM grid with a carbon/Formvar film (Product 01801, Ted Pella, Inc, Redding, Calif.), and dried at ambient conditions.

The dried samples were imaged using a Transmission Electron Microscope (TEM) (HITACHI H-9000NAR, Hitachi, Ltd., Tokyo, Japan) at 300 kV with magnifications ranging from 10K times to 50K times depending on the particle sizes in each sample. Images were captured using Gatan Digital Micrograph software on a CCD camera (ULTRASCAN 894, Gatan, Inc., Pleasanton, Calif.). Each image had a calibrated scale marker.

Particle sizes were measured using a single line through the center of each particle; thus, the measurements are based in the assumption that the particles were spherical. If a particular particle was non-spherical, the measurement line was taken through the longest axis of the particle. In each case, the number of measurements taken on individual particles exceeded that stipulated in the ASTM E122 test method for the error level of 5 nm.

Thermogravimetric Analysis (TGA)

The silica content of the resin dispersion was measured using TGA. A sample of approximately 20 mg of the dispersion was placed into a platinum TGA pan. The pan was loaded into a TGA (Q500, TA Instruments, Inc., New Castle, Del.) and ramped from 30° C. to 900° C. at a rate of 20° C./minute in an air purge gas. After the run, the weight of sample (as a percentage of initial weight) remaining at 850° C. was taken as the weight percent of incombustible material and is reported as the weight percent of the product that is silica solids.

EXAMPLES

TABLE 1

Description of materials used in the preparation of examples.

| Component | Description | Source |
|---|---|---|
| BIS-A | bisphenol A epoxy resin (EPON 828) | Hexion Specialty Chemicals, Columbus, Ohio |
| BIS-F | bisphenol F epoxy resin (EPON 862) | Hexion Specialty Chemicals |
| H-107 | cyclohexane dimethanol diglycidyl ether (reactive diluent; HELOXY 107) | Hexion Specialty Chemicals |
| NP-D1-A | silica nanoparticle sol (71 nm) (NALCO 2329K, lot BP8K0492A0) | Nalco Chemical Company, Naperville, Illinois |
| NP-D1-B | silica nanoparticle sol (74 nm) (NALCO 2329, lot BP9G2219A2) | Nalco Chemical Company |
| NP-D2-A | silica nanoparticle sol (5 nm) (NALCO 2326, lot BP8B0693A1) | Nalco Chemical Company |
| NP-D2-B | silica nanoparticle sol (31 nm) (NALCO 2327, lot BP9J1622A4) | Nalco Chemical Company |
| NP-BM | silica nanoparticle sol (28 and 61 nm) (NALCO 2329, lot BP7J0477B1) | Nalco Chemical Company |
| TMPS-1 | trimethoxy phenyl silane (lot 8L-13845) | Gelest, Inc., Morrisville, Pennsylvania |
| TMPS-2 | trimethoxy phenyl silane (lot 10109982) | Alfa Aesar, Ward Hill, Massachusetts |
| TMPS-3 | trimethoxy phenyl silane (lot 1B-15944) | Gelest, Inc. |

Comparative Example 1

CE-1 was Prepared as Follows 1.669 parts by weight of NP-D1-A nanoparticle sol (39.5 wt % silica in an aqueous sol) was charged to an open head stainless steel mixing vessel and 1 part by weight methoxy propanol was added slowly while agitating. Then, 0.01714 parts by weight of TMPS-1 was slowly added to the mixture. The mixture was allowed to agitate with a pneumatically-driven impeller for 30 minutes.

Hydrothermal Reactor Procedure. A 27 liter continuous flow hydrothermal reactor, such as described in PCT Publication number WO2009/120846 A2 was used to surface functionalize the silica particles. The 27 liter hydrothermal reactor had 18.3 meters of 1.27 cm outer diameter (OD); 1.09 cm inner diameter (ID)) stainless steel tubing, followed by 12.2 meters of 0.95 cm OD; 0.77 cm ID) stainless steel tubing, followed by 198.1 meters of 1.27 cm ID PTFE smooth bore inner tube with a high strength 304 stainless steel braided exterior. The oil temperature in the hydrothermal reactor was maintained at 155° C., and the TESCOM backpressure regulator (TESCOM, Elk River, Minn.) was maintained at 2.3

MPa (330 psig). A diaphragm pump (LDC1 ECOFLOW, American Lewa, Holliston, Mass.) was used to control the flowrate, and thus the residence time, such that a flowrate of 600 ml/min through the hydrothermal reactor was obtained, providing a residence time of 45 minutes. The effluent from the continuous flow hydrothermal reactor was collected in a HDPE drum.

5.423 parts by weight of the hydrothermal reactor effluent, 1 part by weight methoxy propanol, and 1.365 parts by weight BIS-A epoxy resin were added to a 380 Liter kettle with agitation forming a feed mixture. The kettle was kept at 25° C. and the components were agitated for a minimum of 14 hours.

WFE Procedure. The mixture was metered to the top entrance of a Wiped Film Evaporator (WFE) as described U.S. Provisional Application No. 61/181,052 (filed 26 May 2009), using a 1 square meter BUSS FILMTRUDER counter current polymer processing machine, using a BLB series rotary external spur gear, and a chemical duty gear pump (Zenith Pumps, Sanford, N.C.). The WFE rotor, a BUSS Filmtruder-type, was set at a speed of 340 rpm with a 25 Horsepower drive. Vacuum was applied at a level of 2.5 to 2.8 kPa. The feed mixture was subject to the conditions shown in Table 2.

TABLE 2

Wiped Film Evaporator (WFE) conditions.

| Ex. | Feed rate (kg/hr) | Vacuum (kPa) | Steam Temperature (° C.) | | | | Product Temperature (° C.) |
|---|---|---|---|---|---|---|---|
| | | | Zone 1 | Zone 2 | Zone 3 | Zone 4 | |
| CE-1 | 71.2 | 2.7 | 108 | 108 | 150 | 115 | 117 |
| CE-6 | 69.5 | 2.7 | 108 | 108 | 150 | 134 | 119 |
| EX-8 | 74.1 | 2.7 | 108 | 108 | 150 | 134 | 109 |
| EX-9 | 75.5 | 2.7 | 108 | 108 | 150 | 148 | 129 |
| EX-10 | 75.9 | 2.7 | 108 | 108 | 150 | 134 | 119 |
| EX-11 | 59.1 | 2.7 | 108 | 108 | 150 | 148 | 129 |

After approximately 15 minutes of operation, the product effluent from the wiped film evaporator was isolated as a solvent-free, bluish-white, fluid, liquid material. As the nanoparticle-containing resin system cooled, it thickened to a sticky, non-flowing, viscous material. TGA result showed silica solids to be 49.48 wt. % in the nanoparticle epoxy resin produced in CE-1. Analysis of residual solvent by GC showed less than 0.05 wt % methoxy propanol and no detectable amount of water remaining in the resin system.

Examples 1-3 and Comparative Example 2

A surface-modified silica sol ("SOS-1") was prepared by adding 1 part by weight NP-D2-B nanoparticle sol (41.4% silica in an aqueous dispersion) to a jar with a magnetic stir-bar. The jar was placed on a stir plate and solution was stirred to create a 3 to 5 cm vortex. 1.127 parts by weight methoxy propanol were mixed with 0.051 parts by weight TMPS-1. The methoxypropanol mixture was poured slowly into the jar containing the nanoparticle sol while the mixture was agitated with the magnetic stir-bar. The jar was sealed and placed into a batch oven at 80° C. for 16 hours. The resulting material (SOS-1) contained 19.0 wt. % surface-modified silica nanoparticles.

A dispersion of surface-modified silica nanoparticles in epoxy resin ("SOSE-1") was prepared by combining 7.90 parts by weight of SOS-1, 1 part by weight methoxy propanol, and 1.5 parts by weight BIS-A epoxy resin in a 1000 mL wide-mouth round bottom flask. The solvent in the sample was removed with a BUCHI ROTAVAPOR R-210 (BUCHI Labortechnik AG, Flawil, Switzerland) that was connected to a vacuum pump (Precision Scientific, Chicago, Ill.) with a vacuum level of approximately 95 kPa. The round bottom flask was gradually heated with an oil bath to a final temperature of 150° C. which was held for 30 minutes.

TGA was performed on the resulting dispersion of surface-modified silica nanoparticles in epoxy resin (SOSE-1), and the silica solids were measured as 48.8 wt. %. GC was used to verify that the sample contained no measurable water and the methoxy propanol level was less than 0.05 wt %.

Example 1 (EX-1) and Example 2 (EX-2) were prepared by combining the nanoparticle in epoxy dispersion of CE-1 with nanoparticle in epoxy dispersion of SOSE-1 in the amounts listed in Table 3. The samples were agitated using a SpeedMixer™ dual asymmetric centrifuge (model DAC600 FVZ-sp, available from Flack Tek Incorporated, Landrum, S.C.) DAC mixer at 2000 rpm for 30 seconds. After 30 seconds, the samples were mixed manually with a thin stir stick for approximately 30 seconds to ensure that high-viscosity material was getting dispersed throughout the sample, and not remaining on the center bottom of the mixing cup. After the manual mixing, the sample was mixed again in the DAC mixer at 2000 rpm for 30 seconds. The resulting uniform mixtures are referred to as Examples EX-1 and EX-2.

Example 3 (EX-3) and Comparative Example 2 (CE-2) were prepared by combining additional amounts of CE-1 with the dispersion of EX-2. Comparative Example 3 (CE-3) was prepared by combining the materials of CE-1 and SOSE-1 in the amounts shown in Table 3. The procedures used to combine and process the materials were the same as that described for the preparation of Examples EX-1 and EX-2.

Based on the measured amount of silica in each of CE-1 and SOSE-1, and the ratio at which these materials were combined, the total weight fraction of silica solids in Examples EX-1, EX-2, EX-3 and Comparative Examples CE-2 and CE-3 was calculated and included in Table 3.

TABLE 3

Weight in grams of the materials used to prepare Examples EX-1, EX-2, and EX-3 and Comparative Examples CE-2 and CE-3.

| Example | CE-1 | SOSE-1 | EX-2 | EX-3 | Wt. % silica |
|---|---|---|---|---|---|
| EX-1 | 5.01 | 5.12 | — | — | 49.1 |
| EX-2 | 7.55 | 1.38 | — | — | 49.4 |
| EX-3 | 3.65 | — | 6.92 | — | 49.4 |
| CE-2 | 5.99 | — | — | 6.00 | 49.4 |
| CE-3 | 37.95 | 1.02 | — | — | 49.3 |

Examples 4-7 and Comparative Examples 4 and 5

A surface-modified silica sol ("SOS-2") was prepared by placing 1200 grams of a NP-D2-A silica nanoparticle sol (17.0 wt. % silica in an aqueous dispersion) in a 5 liter beaker with condenser, thermowatch and overhead stirrer. While stirring at medium agitation, a premixed solution of 1800 grams of 1-methoxy-2-propanol and 70.8 grams of TMPS-2 was added over a period of approximately 10 minutes. The resulting uniform solution was heated at 90-95° C. for approximately 20 hours. The solution was then distilled to remove the majority of the water and to concentrate the solution during which, approximately 780 grams of a 1-methoxy-2-propanol/water mixture was removed. The resulting material was SOS-2.

A dispersion of surface-modified silica nanoparticles in epoxy resin ("SOSE-2") was prepared by combining 3.67 parts by weight of SOS-2 and 1 part by weight of BIS-A epoxy resin. These materials were stirred well, then gradually heated and stripped on a BUCHI rotorevapotor to a final stripping temperature of 150° C. for 60 minutes. TGA was performed on the resulting dispersion of surface-modified silica nanoparticles in epoxy resin (SOSE-2), and the silica solids were measured as 28.5 wt. %.

Example 4 (EX-4), Example 5 (EX-5), and Example 7 (EX-7) were prepared by combining the dispersion of surface modified nanoparticles in epoxy resin of CE-1 and SOSE-2 in varying amounts, as described in Table 4. The method for combining CE-1 and SOSE-2 is the same as that described for EX-1.

Example 6 (EX-6) was prepared by combining additional amounts of CE-1 with the dispersion of EX-5. Comparative Example 4 (CE-4) and Comparative Example 5 (CE-5) were prepared by combining the materials of CE-1 and EX-7 in the amounts shown in Table 4. The procedures used to combine and process the materials were the same as that described for the preparation of Example EX-1.

TABLE 4

Weight in grams of the materials used to prepare Examples EX-4 to EX-7 and Comparative Examples CE-4 and CE-5.

| Example | CE-1 | SOSE-2 | EX-5 | EX-7 | Wt. % silica |
|---------|------|--------|------|------|--------------|
| EX-4 | 3.5 | 6.07 | — | — | 36.2 |
| EX-5 | 7.53 | 2.32 | — | — | 44.5 |
| EX-6 | 9.82 | — | 10.53 | — | 47.7 |
| EX-7 | 43.54 | 0.079 | — | — | 49.2 |
| CE-4 | 4.05 | — | — | 9.42 | 49.3 |
| CE-5 | 7.51 | — | — | 2.52 | 49.3 |

Comparative Example 6

Comparative Example 6 (CE-6) was prepared by charging 1.694 parts by weight of NP-D1-B silica nanoparticle sol (40.99 wt % silica in water) to an open head stainless steel mixing vessel. Then, 1 part by weight methoxy propanol was added slowly while agitating, and then 0.0185 parts by weight of TMPS-1 was added to the mixture. The mixture was allowed to agitate with a pneumatically-driven impeller for 30 minutes.

A continuous flow hydrothermal reactor was used to was used to surface functionalize the silica particles according to the Hydrothermal Reactor Procedure described in Comparative Example CE-1. The oil temperature in the hydrothermal reactor was maintained at 150° C., and the backpressure regulator was maintained at 2.3 MPa (330 psig). The diaphragm pump was used to control the flowrate, and thus the residence time, such that a flowrate of approximately 770 ml/min through the 27 Liter continuous flow hydrothermal reactor was obtained, providing a residence time of 35 minutes. The effluent from the continuous flow hydrothermal reactor was collected in an HDPE drum.

5.407 parts by weight of the hydrothermal reactor effluent, 1 part by weight methoxy propanol, and 1.351 parts by weight BIS-F epoxy resin were added to a 380 Liter kettle with agitation to form a feed mixture. The kettle was kept at 25° C. and the components were agitated for a minimum of 14 hours. The mixture was processed using a wiped film evaporator according to the WFE Procedure described in Comparative Example CE-1 except LUWA Vicon-type rotor was used. The WFE rotor was set at a speed of 780 rpm with a 15 Horsepower drive. The feed mixture was subject to the WFE conditions shown in Table 2. After approximately 15 minutes of operation, the product effluent was isolated as a solvent-free, bluish-white, fluid, liquid material. As the material cooled, it thickened to a sticky, non-flowing, viscous material.

TGA showed silica solids to be 49.29 wt. % in the nanoparticle epoxy resin produced as Comparative Example CE-6. Analysis of residual solvent by GC showed less than 0.05 wt % methoxy propanol and no detectable amount of water remaining in the nanoparticle in epoxy dispersion.

Examples 8, 9, and 11

Additional batches of surface-modified silica sols ("SOS") were prepared from the NP-D2-B nanoparticle sol using the same materials and according to the same methods as described in Examples 1 and 2 to make surface-modified silica sol SOS-1.

Examples EX-8, EX-9, and EX-11 were prepared according to the following procedures using the materials and conditions summarized in Table 5.

NP-D1-B silica sol (41.15 wt % silica in an aqueous solution) was charged to an open head stainless steel mixing vessel and 1 part by weight methoxy propanol was added slowly while agitating. Then, TMPS-1 surface-modifying agent was added to the mixture. The mixture was allowed to agitate with a pneumatically-driven impeller for 30 minutes.

For Examples EX-8 and EX-11, a continuous flow hydrothermal reactor was also used to functionalize particle according to the Hydrothermal Reactor Procedure described in Comparative Example CE-1, except the following modifications were made to the reactor. The 26 Liter continuous flow hydrothermal reactor consisted of 12.2 meters of 0.95 cm OD (0.77 cm ID) stainless steel tubing followed by 198.1 meters of 1.27 cm ID PTFE smooth bore inner tube with a high strength 304 stainless steel braided exterior. The oil temperature in the hydrothermal reactor was maintained at 155° C., and the backpressure regulator was maintained at 2.3 MPa (330 psig). The diaphragm pump was used to control the flowrate through the hydrothermal reactor, providing a residence time of 35 minutes. Again, the effluent from the continuous flow hydrothermal reactor was collected in an HDPE drum.

For Example EX-9, a continuous flow hydrothermal reactor was used to was used to surface functionalize the silica particles according to the Hydrothermal Reactor Procedure described in Comparative Example CE-1. The oil temperature in the hydrothermal reactor was maintained at 150° C., and the backpressure regulator was maintained at 2.3 MPa (330 psig). The diaphragm pump was used to control the flowrate through the hydrothermal reactor, providing a residence time of 35 minutes. The effluent from the continuous flow hydrothermal reactor was collected in an HDPE drum.

The hydrothermal reactor effluent, 1 part by weight methoxy propanol, the epoxy resins (BIS-A epoxy resin and H-107 reactive diluent for EX-9; and BIS-F epoxy resin for EX-8 and EX-11), and the surface-modified NP-D2-B silica sol were added to a 380 Liter kettle with agitation forming a feed mixture. The kettle was kept at 25° C. and the components were agitated for a minimum of 14 hours.

The mixture was processed using a wiped film evaporator according to the WFE Procedure described in Comparative Example CE-1, except a LUWA Viscon-type rotor was used. The WFE rotor was set at a speed of 780 rpm with a 15 Horsepower drive. The feed mixture was subject to the WFE conditions shown in Table 2. After approximately 15 minutes of operation, the product effluent was isolated as a solvent-free, bluish-white, fluid, liquid material. As the material cooled, it thickened to a sticky, viscous material.

TABLE 5

Parts by weight of materials used to prepare Examples EX-8, EX-9, and EX-11.

| | Hydrothermal reactor | | | Wiped film evaporator | | | | Silica |
|---|---|---|---|---|---|---|---|---|
| Ex. | NP-D1-B | TMPS-1 | Effl. (*) | BIS-A | BIS-F | H-107 | SOS | (wt. %) |
| EX-8 | 1.699 | 0.0186 | 5.398 | — | 1.583 | — | 1.507 | 49.8 |
| EX-9 | 1.694 | 0.0185 | 5.405 | 1.259 | — | 0.315 | 1.149 | 49.4 |
| EX-11 | 1.699 | 0.0186 | 5.398 | — | 1.583 | — | 1.507 | 49.8 |

(*) Effluent from the hydrothermal reactor fed to the wiped film evaporator.

Example 10

Example EX-10 was prepared according to the procedures set forth for Examples EX-8, EX-9, and EX-11, except as follows.

Example EX-10 was prepared using 1.665 parts by weight of NP-BM silica sol (39.9 wt % silica in an aqueous dispersion), 1 part by weight methoxy propanol, and 0.0221 parts by weight of TMPS-1 surface modifying agent. The material was processed with the hydrothermal reactor at a flowrate of 600 ml/min providing a residence time of 45 minutes per the Hydrothermal Reactor Procedure use in CE-1. The effluent was collected in a drum.

5.352 parts by weight of the hydrothermal reactor effluent, 1 part by weight methoxy propanol, 1.298 parts by weight BIS-A epoxy were added to a 380 Liter kettle with agitation forming a feed mixture. The kettle was kept at 25° C. and the components were agitated for a minimum of 14 hours. The mixture was processed in the wiped film evaporator, per the WFE Procedure of CE-1, with WFE rotor set at a speed of 340 rpm with a 25 Horsepower drive. The feed mixture was subject to the WFE conditions shown in Table 2. After approximately 15 minutes of operation, the product effluent was isolated as a solvent-free, bluish-white, fluid liquid material. As the material cooled, it thickened to a sticky, non-flowing, viscous resin.

TGA result showed silica solids to be 49.15 wt. % in the nanoparticle epoxy resin dispersion of Example EX-10. Analysis of residual solvent by GC showed less than 0.05 wt % methoxy propanol and no detectable amount of water remaining in the product.

Comparative Examples 7 and 8 and Example 12

CE-7, CE-8 and EX-12 were created by combining CE-6 with EX-11 in varying amounts as illustrated in Table 6. The method for combining CE-6 with EX-11 is the same as that described in EX-1 to combine CE-1 and SOSE-1.

TABLE 6

Materials used in Example EX-12 and Comparative Examples CE-7 and CE-8.

| Ex. | CE-6 (g) | EX-11 (g) | Silica (wt. %) |
|---|---|---|---|
| CE-7 | 7.56 | 7.56 | 49.5 |
| CE-8 | 8.03 | 1.59 | 49.4 |
| EX-12 | 2.32 | 4.58 | 49.6 |

Characterization of the dispersions of nanoparticles in a resin component.

Transmission electron microscopy was used to determine the particle size distributions of the various commercially obtained silica sols according to the Transmission Electron Microscopy Procedure. The number fraction distribution of particle sizes is shown in FIGS. 1A-1E. Using these distribution data and the resulting curves, modes of the distribution were identified by selecting a minimum and maximum diameter (i.e., the range) for a mode. The average particle size within each mode and the percent by number of particles within that mode were then calculated. In some distributions, a small fraction of the particles did not fall within an identified mode. The characteristics of the distributions are summarized in Table 7.

TABLE 7

Particle diameter distributions of commercially obtained silica sols.

Figure 1B:
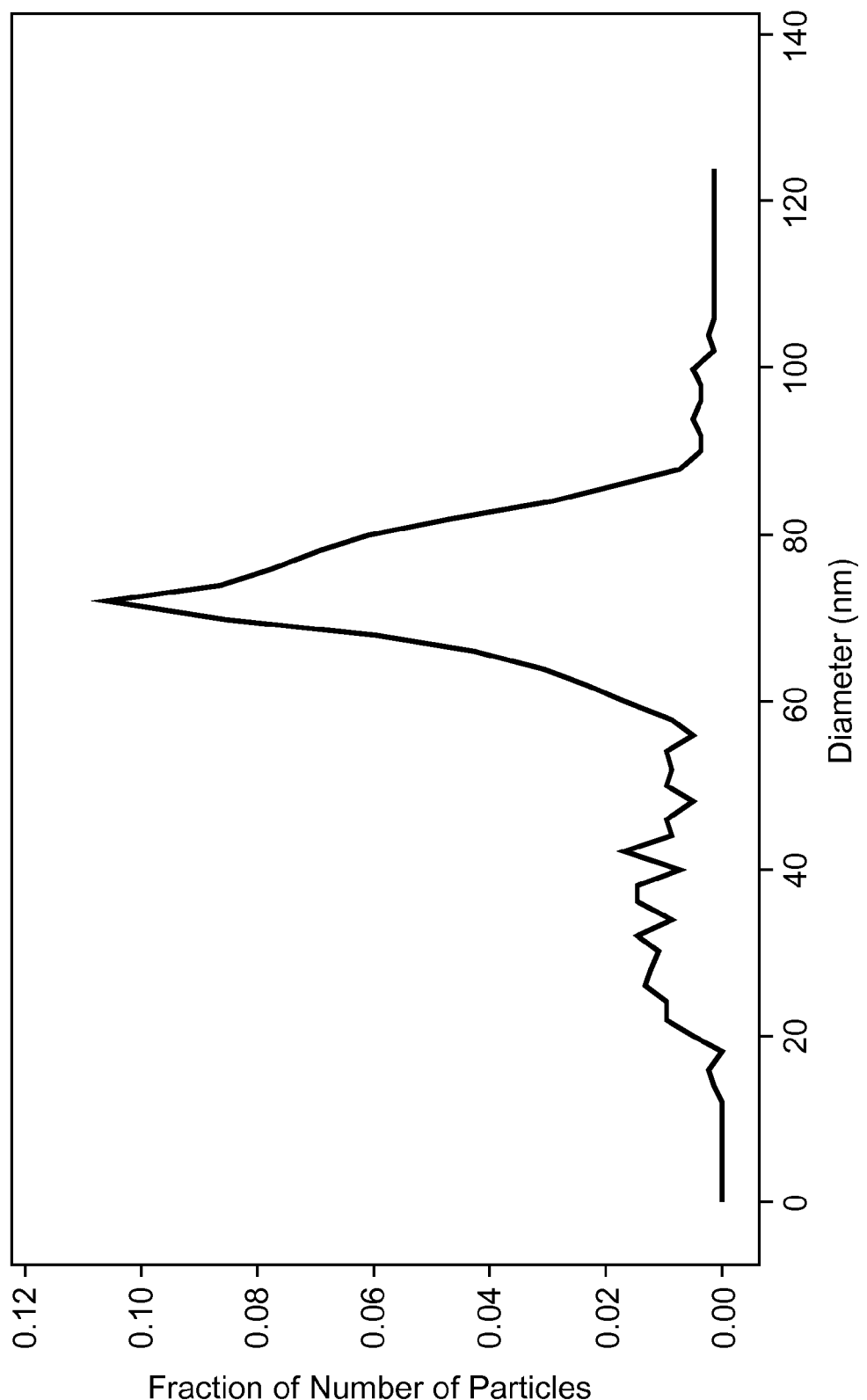
FIG. 1B is a number fraction size distribution of the NP-D1-B nanoparticles.
Figure 1C:
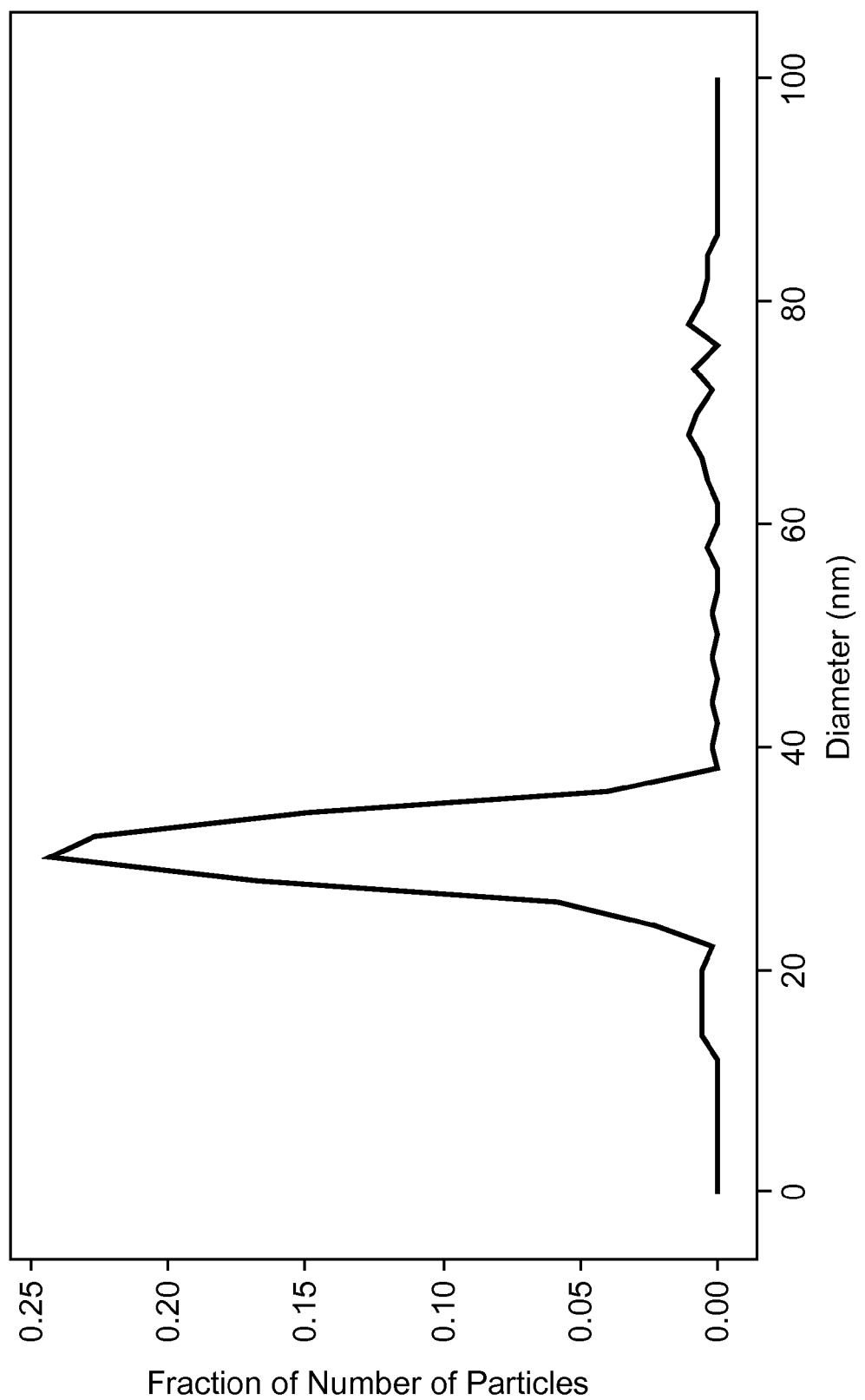
FIG. 1C is a number fraction size distribution of the NP-D2-B nanoparticles.
Figure 1D:
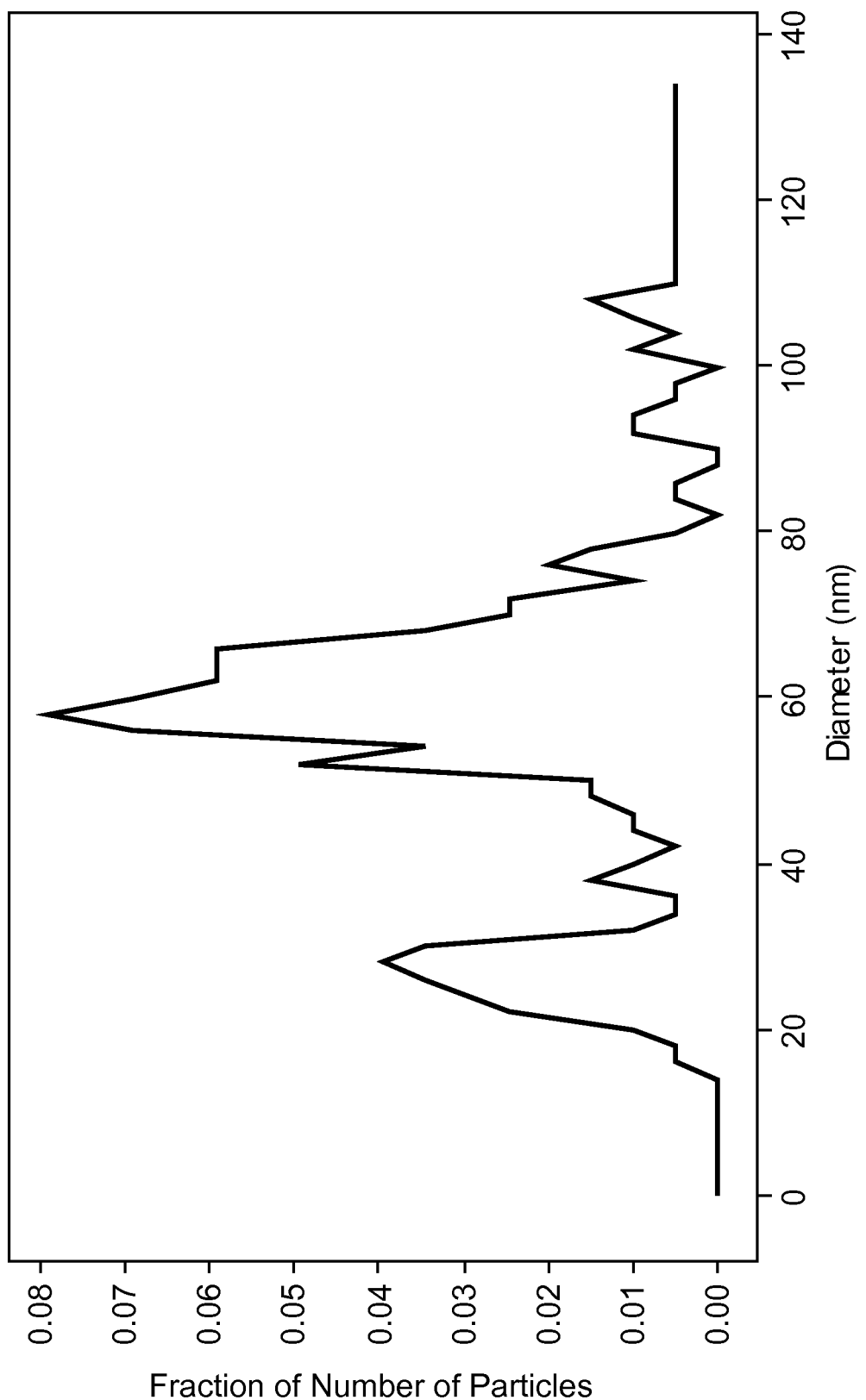
FIG. 1D is a number fraction size distribution of the NP-BM nanoparticles.

| | | Smaller nanoparticles (nm) | | | | Larger nanoparticles (nm) | | | | Other |
|---|---|---|---|---|---|---|---|---|---|---|
| Sol | Figure | Avg | Min | Max | N % | Avg | Min | Max | N % | N % |
| NP-D1-A | FIG. 1A | 27 | 14 | 42 | 13% | 71 | 50 | 94 | 87% | 0% |
| NP-D1-B | FIG. 1B | 36 | 14 | 54 | 19% | 74 | 56 | 92 | 78% | 3% |
| NP-D2-A | FIG. 1C | 5 (*) | — | — | 100% | — | — | — | — | 0% |
| NP-D2-B | FIG. 1D | 31 | 22 | 38 | 91% | — | — | — | — | 9% |
| NP-BM | FIG. 1E | 28 | 14 | 42 | 23% | 61 | 44 | 82 | 66% | 11% |

(*) Distribution data were not collected, particle size assumed to be 5 nm based on manufacturer's designation.

Figure 2:
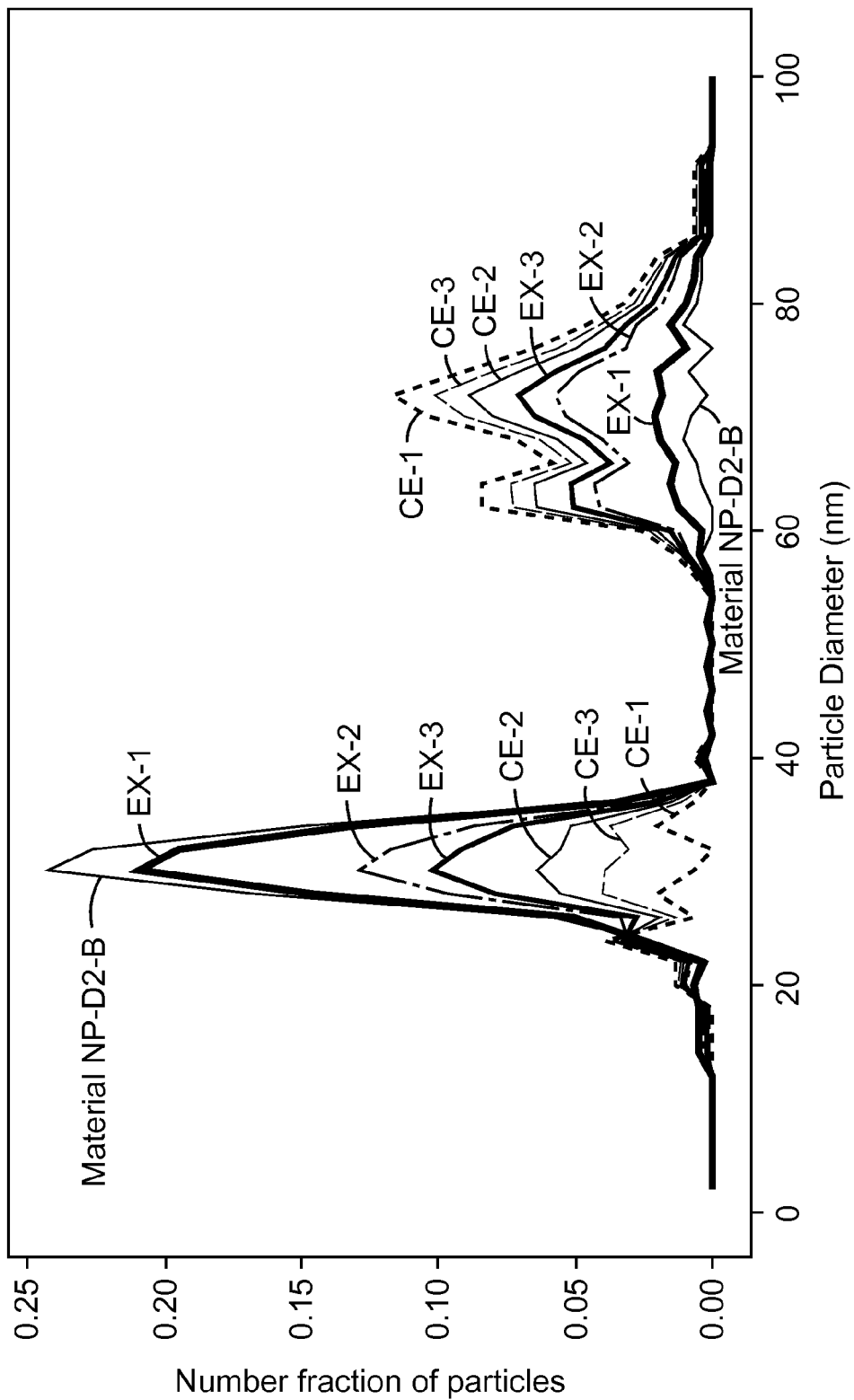
FIG. 2 shows the number fraction size distributions of blends of the NP-D1-A and NP-D2-B nanoparticles.

Bimodal distribution with a ratio of D1/D2 of 2.3 in BIS-A epoxy resin. Comparative Examples CE-1, CE-2, CE-3, and Examples EX-1, EX-2, and EX-3 are based on a combination of the bimodal NP-D1-A nanoparticles with increasing amounts of the smaller, unimodal NP-D2-B nanoparticles in the BIS-A epoxy resin. As shown in FIG. 2, because the average diameter of the NP-D2-B nanoparticles was approximately equal to the average diameter of the smaller mode (D2) of the NP-D1-A nanoparticles, the resulting combination led to a bimodal distribution having a diameter ratio (D1/D2) of 2.3. The number fractions of the small and large particles were calculated based on the measured distributions of the NP-D1-A and NP-D2-B materials and their relative amounts in each mixture. Number fraction calculations exclude the particles not falling within either of the first or second mode. The distributions are summarized in Table 8.

Rheology Test Procedure.

In each of the rheological experiments, the dispersion tested contained only the surface-modified nanoparticles and the resins. No curative was added; thus, when an increase in viscosity with increasing temperature occurred, it is not attributable to a curing mechanism. Rather, this upturn in viscosity at higher temperatures is referred to herein as "particle stacking," or merely "stacking," as in Table 8.

Rheometric analyses of the resin components and the nanoparticle-containing resins systems were conducted on an ARES RHEOMETRIC SCIENTIFIC rheometer with parallel plate geometry (TA Instruments, New Castle, Del.). The rheology characterization was completed in dynamic mode with a parallel plate (25 mm) geometry and a gap of 1 mm. For the complex viscosity versus temperature (Eta* vs. Temperature) plots, the frequency of oscillation was 1 Hz and the strain used in the measurement was dependent on the overall viscosity of the material. For nanoparticle epoxy mixtures containing only the BIS-A epoxy resin, a method was used wherein the initial strain was 2%, and the equipment auto-adjusted the strain during the course of the run up to a maximum of 40% in order to keep the torque measurement within the sensitivity range of the equipment. For the resin components, and the nanoparticle-containing resin systems containing BIS-F epoxy resin, or a combination of BIS-A epoxy resin and H-107 reactive diluent, the initial strain was set to 25%, and the maximum strain allowed was 100%. The strain is an important parameter because the nanoparticle epoxy products which exhibited particle stacking also showed shear sensitive rheology. Thus, if the sample exhibits particle stacking, different Eta* vs. Temperature curves would be obtained with the two different shear methods on the same sample.

At 30° C., the complex viscosity of BIS-A epoxy was 5 Pa·s, as measured according to the Rheology Test Procedure. At 30° C., the complex viscosity of a blend of 80 wt. % BIS-A epoxy resin and 20 wt. % H-107 reactive diluent was 3 Pa·s.

Figure 3:
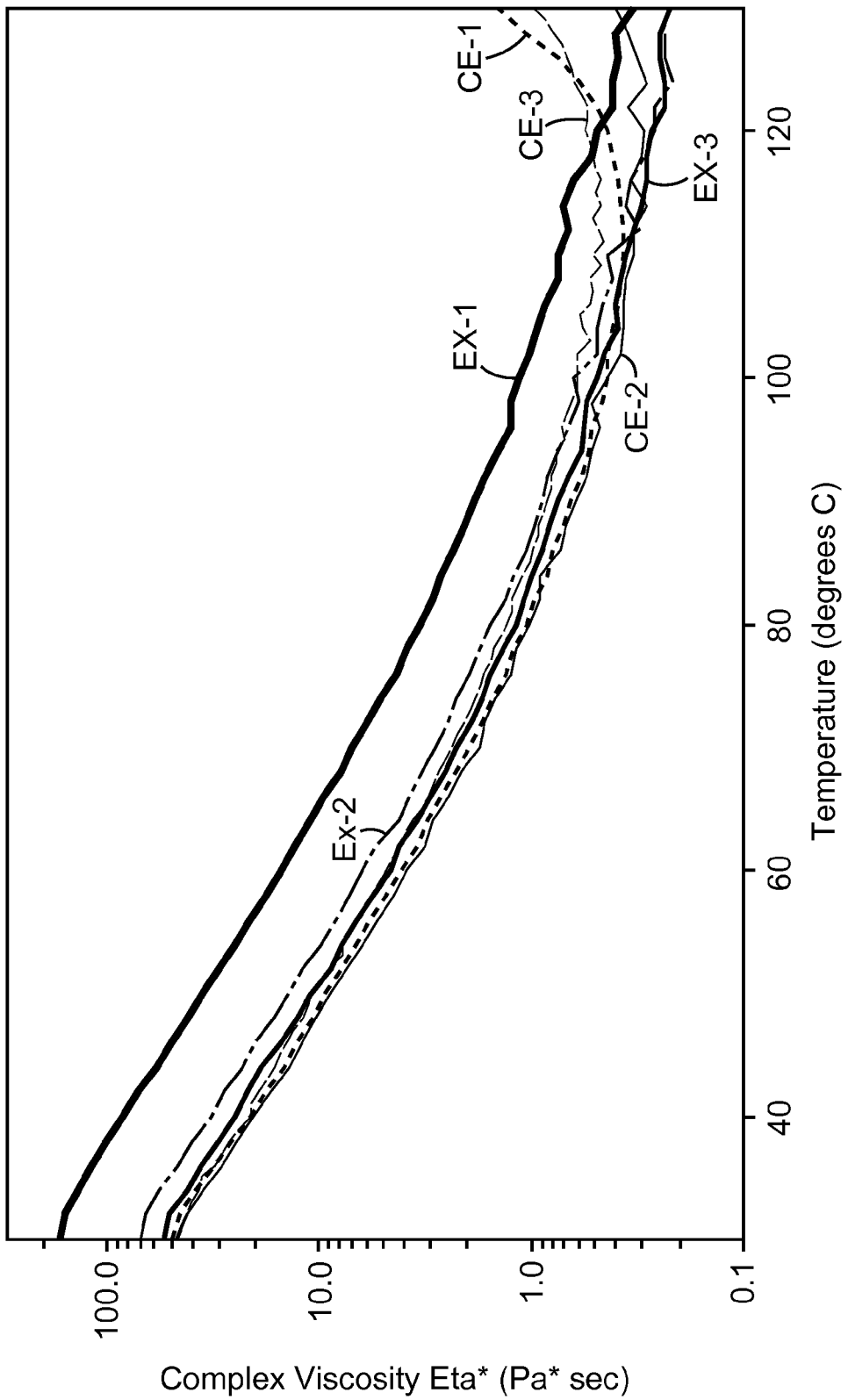
FIG. 3 shows the rheology profiles of surface modified nanoparticles having a bimodal distribution with a ratio of D1/D2 of 2.3 in the BIS-A epoxy resin.

Rheology data for Comparative Examples CE-1, CE-2, CE-3, and Examples EX-1, EX-2, and EX-3 were obtained using the Rheology Test Procedure. The results are shown in FIG. 3, and are summarized in Table 8.

TABLE 8

Composition and rheology results for a D1/D2 = 2.3 bimodal distribution of surface modified silica nanoparticles in the BIS-A epoxy resin.

| Ex. | Wt. ratio NP-D1-A: NP-D2-B | NF1 (71 nm) 50-94 nm | NF2 (27 nm) 14-42 nm | NF2/ NF1 = N2/N1 | Complex Viscosity (Pa·s) (at 30° C.) | Stacking |
|---|---|---|---|---|---|---|
| CE-1 | 100:0 | 0.87 | 0.13 | 0.2 | 49 | Yes |
| CE-3 | 97.5:2.5 | 0.76 | 0.24 | 0.3 | 52 | Yes |
| CE-2 | 95.5 | 0.67 | 0.33 | 0.5 | 47 | Yes |
| EX-3 | 90:10 | 0.54 | 0.46 | 0.8 | 53 | No |
| EX-2 | 85:15 | 0.45 | 0.55 | 1.2 | 70 | No |
| EX-1 | 50:50 | 0.18 | 0.82 | 4.6 | 170 | No |

As shown in FIG. 3, for a ratio of large diameter to small diameter (D1/D2) of 2.3, the ratio of the number fraction of small particles to large particles (NF2/NF1) must be greater than 0.5, e.g., at least 0.8, to eliminate particle stacking. However, as NF2/NF1 increases, there is an increase in the complex viscosity at 30° C. Generally, the complex viscosity at 30° C. is indicative of processability and handleability; therefore, significant increases in this viscosity can be undesirable. For example, the viscosity of EX-1, which has a ratio of NF2/NF1 of 4.6, is 170 Pa·s. This is about 3.5 times greater than the viscosity of CE-1, and may be excessively high for some applications.

Figure 4:
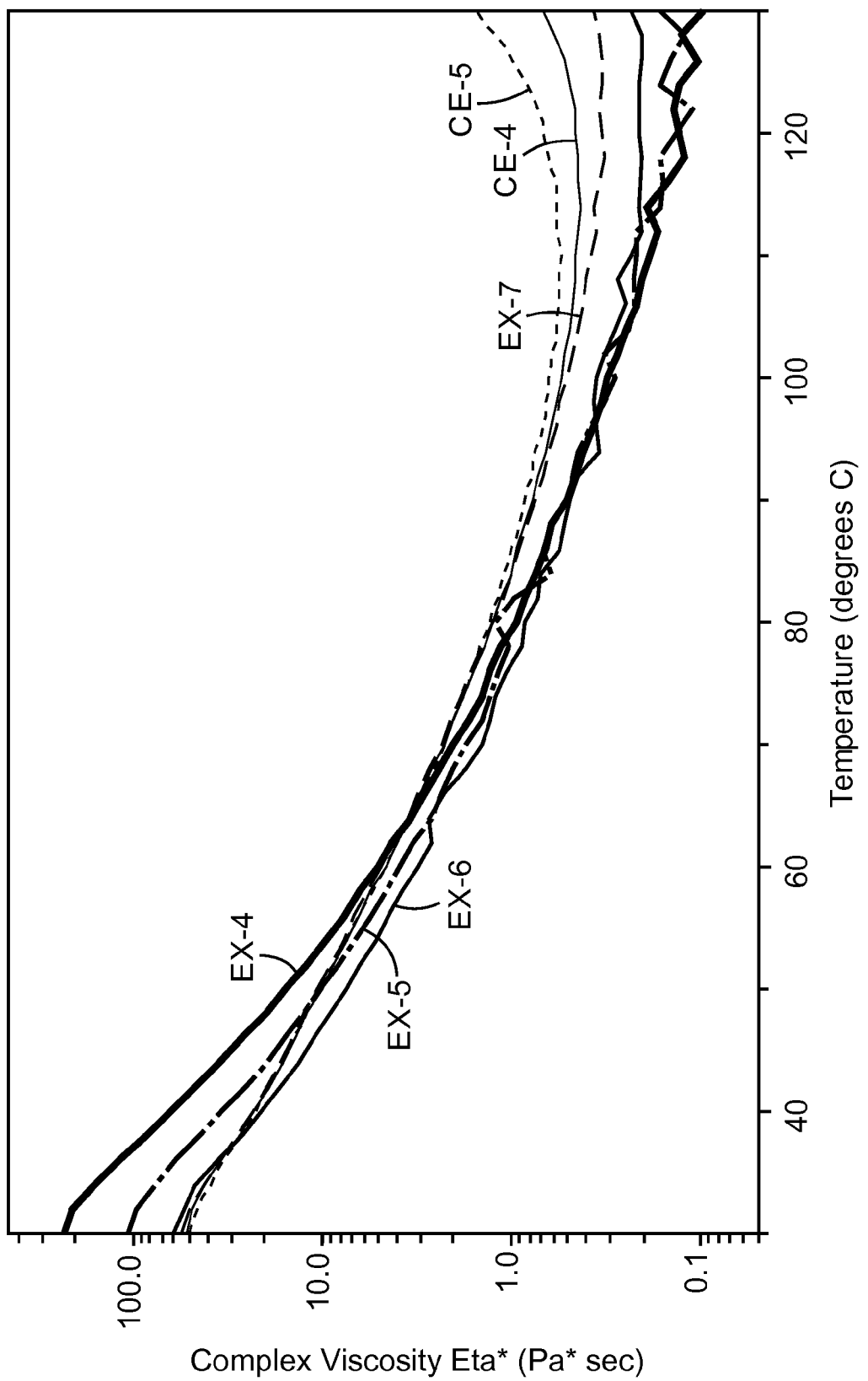
FIG. 4 shows the rheology profiles of surface modified nanoparticles having a bimodal distribution with a ratio of D1/D2 of 14 in the BIS-A epoxy resin.

Trimodal distribution with a ratio of D1/D2 of 14 in BIS-A epoxy resin. Comparative Examples CE-4 and CE-5, and Examples EX-4, EX-5, EX-6, and EX-7 are based on a combination of the NP-D1-A nanoparticles with increasing amounts of the smaller NP-D2-A nanoparticles in the BIS-A epoxy resin. The addition of the 5 nm NP-D2-A nanoparticles to the bimodal distribution of the NP-D1-A nanoparticles led to a trimodal distribution. In these distribution, the greatest number of particles fell in the modes having an average size of 71 nm (the first mode) and an average size of 5 nm (the second mode). This yielded samples having a diameter ratio (D1/D2) of 14. The number fractions of the small and large particles were calculated based on the measured distribution of the NP-D1-A nanoparticles and the assumed distribution of the NP-D2-A nanoparticles, and their relative amounts in each mixture. Particles falling outside the first and second mode, including the particles falling in the third mode having an average diameter of 27 nm, were not included in these calculations. No greater than about 9% of the nanoparticles were excluded from the calculations. Rheology data were collected using the Rheology Test Procedure and the results are shown in FIG. 4. The distributions and rheology behavior are summarized in Table 9.

TABLE 9

Composition and rheology results for a D1/D2 = 14 trimodal distribution of surface modified silica nanoparticles in the BIS-A epoxy resin.

| Ex. | Wt. ratio NP-D1-A: NP-D2-A | NF1 (71 nm) 50-94 nm | NF2 (5 nm) 0-6 nm | NF2/ NF1 = N2/N1 | Complex Viscosity (Pa·s) (at 30° C.) | Stacking |
|---|---|---|---|---|---|---|
| CE-5 | 99.97:0.03 | 0.69 | 0.31 | 0.45 | 50 | Yes |
| CE-4 | 99.93:0.07 | 0.44 | 0.56 | 1.2 | 52 | Yes |
| EX-7 | 99.9:0.1 | 0.37 | 0.63 | 1.7 | 55 | No |
| EX-6 | 95:5 | 0.01 | 0.99 | 90 | 61 | No |
| EX-5 | 85:15 | 0.003 | 0.997 | 300 | 104 | No |
| EX-4 | 50:50 | 0.0006 | 0.9994 | 1700 | 226 | No |

As shown in FIG. 4, for a ratio of large diameter to small diameter (D1/D2) of 14, the ratio of the number fraction of small particles to large particles (NF2/NF1) must be greater than 1.2, e.g., at least 1.7, to eliminate particle stacking Again, however, as NF2/NF1 increases, there is an increase in the complex viscosity at 30° C. The viscosities of EX-4 and, particularly, EX-5 may be excessively high for some applications.

Figure 5:
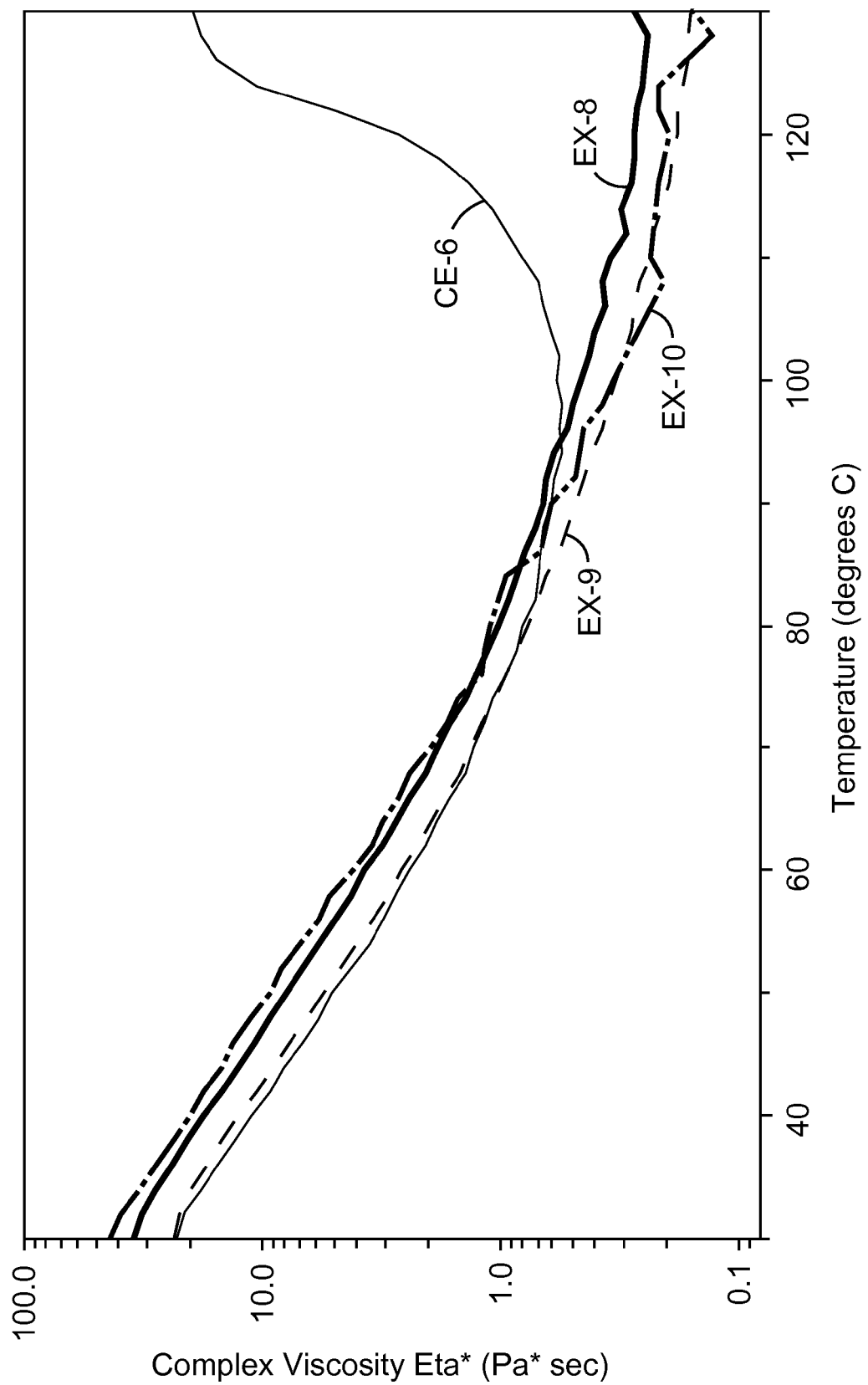
FIG. 5 shows the rheology profiles of surface modified nanoparticles having a bimodal distribution with a ratio of D1/D2 of 2.4 in various epoxy-based resin systems.

Bimodal distribution with a ratio of D1/D2 of 2.4. Comparative Examples CE-6 and Examples EX-8 and EX-9 are based on a combination of the NP-D1-B nanoparticles with increasing amounts of the smaller NP-D2-B nanoparticles in various epoxy resins. In these distributions, the particles fell in the modes having an average size of 74 nm (the first mode) and an average size of 31 nm (the second mode). This yielded samples having a diameter ratio (D1/D2) of 2.4. The number fractions of the small and large particles were calculated based on the measured distributions of these materials and their relative amounts in each mixture. Rheology data were collected using the Rheology Test Procedure and the results are shown in FIG. 5. The distributions and rheology behavior are summarized in Table 10.

TABLE 10

Composition and rheology results for a D1/D2 = 2.4 bimodal
distribution of surface modified silica nanoparticles in
the BIS-F epoxy resin (CE-6 and EX-8) and the blend of BIS-A
epoxy resin with the H-107 reactive diluent (EX-9).

| Ex. | Wt. ratio NP-D1-B: NP-D2-B | NF1 (74 nm) 56-92 nm | NF2 (31 nm) 14 to 54 nm | NF2/ NF1 = N2/N1 | Complex Viscosity (Pa·s) (at 30° C.) | Stacking |
|---|---|---|---|---|---|---|
| CE-6 | 100:0 | 0.80 | 0.20 | 0.25 | 23 | Yes |
| EX-9 | 86:14 | 0.41 | 0.59 | 1.4 | 24 | No |
| EX-8 | 85:15 | 0.40 | 0.60 | 1.5 | 35 | No |

As shown in FIG. 5, for a ratio of large diameter to small diameter (D1/D2) of 2.4, a ratio of the number fraction of small particles to large particles (NF2/NF1) of 1.4 is sufficient to eliminate particle stacking without a potentially undesirable increase in the complex viscosity at 30° C.

Example EX-10 was prepared from the NP-BM sol having a significant number of particles in both modes of a bimodal distribution. The first mode had an average diameter, D1, of 61 nm. The number fraction of particles in the first mode, NF1, was 0.74, when normalized to exclude the nanoparticle outside the ranges for the first and second mode. The second mode had an average diameter, D2, of 28 nm. The number fraction of particles in the second mode, NF2, was 0.26. This resulted in a ratio of D1/D2 of 2.2 and a ratio of NF2/NF1 of 0.35. EX-10 was prepared in the BIS-A epoxy resin. The rheology of Example EX-10 is shown in FIG. 5. Example EX-10 did not exhibit stacking, and had a complex viscosity at 30° C. of 44 Pascal seconds (Pa·s).

Figure 6:
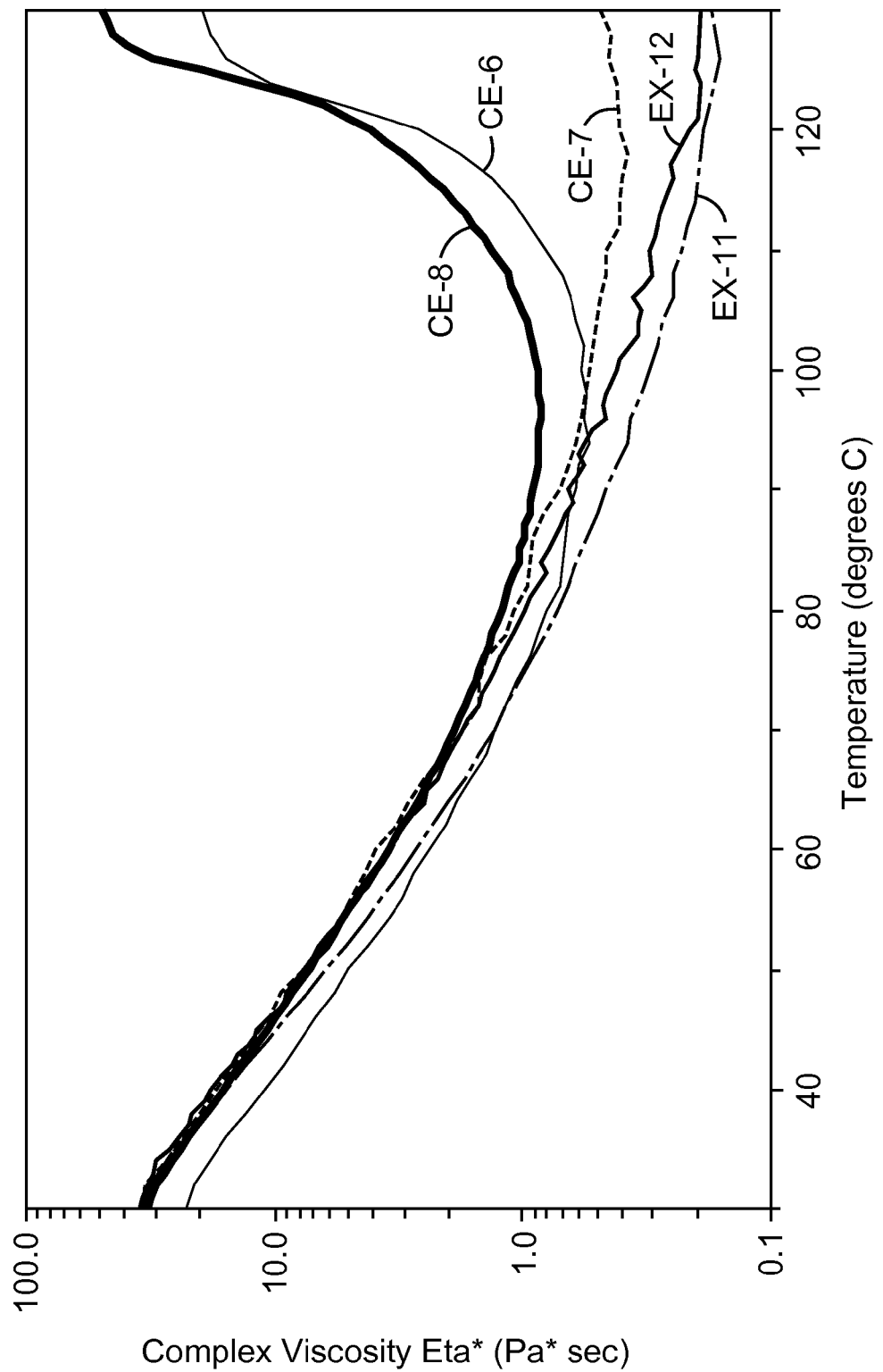
FIG. 6 shows the rheology profiles of surface modified nanoparticles having a bimodal distribution with a ratio of D1/D2 of 2.4 in the BIS-F epoxy resin.

Bimodal distribution with a ratio of D1/D2 of 2.4 in BIS-F epoxy resin. Comparative Examples CE-7 and CE-8, and Examples EX-11 and EX-12 are based on a combination of the NP-D1-B nanoparticles with increasing amounts of the smaller NP-D2-B nanoparticles in the BIS-F epoxy resin. In these distributions, the particles fell in the modes having an average size of 74 nm (the first mode) and an average size of 31 nm (the second mode). This yielded samples having a diameter ratio (D1/D2) of 2.4. The number fractions of the small and large particles were calculated based on the measured distributions of these materials and their relative amounts in each mixture. Rheology data were collected using the Rheology Test Procedure and the results are shown in FIG. 6. The distributions and rheology behavior are summarized in Table 11.

TABLE 11

Composition and rheology results for a D1/D2 =
2.4 bimodal distribution of surface modified silica
nanoparticles in the BIS-F epoxy resin.

| Ex. | Wt. ratio NP-D1-B: NP-D2-B | NF1 (74 nm) 56-92 nm | NF2 (31 nm) 14-54 nm | NF2/ NF1 = N2/N1 | Complex Viscosity (Pa·s) (at 30° C.) | Stacking |
|---|---|---|---|---|---|---|
| CE-6 | 100:0 | 0.80 | 0.20 | 0.25 | 23 | Yes |
| CE-8 | 97.5:2.5 | 0.69 | 0.31 | 0.45 | 32 | Yes |
| CE-7 | 92.5:97.5 | 0.54 | 0.46 | 0.9 | 34 | Yes |
| EX-12 | 90:10 | 0.48 | 0.52 | 1.1 | 35 | No |
| EX-11 | 85:15 | 0.40 | 0.60 | 1.5 | 34 | No |

As shown in FIG. 6, for a ratio of large diameter to small diameter (D1/D2) of 2.4, a ratio of the number fraction of small particles to large particles (NF2/NF1) of greater than 0.9, e.g., at least 1.1, is sufficient to eliminate particle stacking. In addition, even at number fraction of small particles to large particles (NF2/NF1) as high as 1.5, there was no potentially undesirable increase in the complex viscosity at 30° C.

Various modifications and alterations of this invention will become apparent to those skilled in the art without departing from the scope and spirit of this invention.

What is claimed is:

1. A resin system comprising a resin component and surface-modified nanoparticles dispersed in the resin component, wherein the surface-modified nanoparticles have a multimodal particle size distribution comprising a first mode having an average particle size of D1, wherein D1 is between 50 nanometers and 250 nanometers, inclusive, and a number of nanoparticles in the first mode, N1, and
a second mode having an average particle size, D2, wherein D2 is between 20 and 50 nm, inclusive, and a number of nanoparticles in the second mode, N2;
wherein the ratio of D1 over D2 is between 1.5 and 5.0, and the ratio of N2 over N1 is between 1 and 2, inclusive;
wherein the average particle size and number of nanoparticles in a mode are measured according to the Transmission Electron Microscopy Procedure.

2. The resin system of claim 1, wherein the ratio of D1 over D2 is between 2 and 3.

3. The resin system according to claim 1, wherein D1 is between 60 and 100 nm, inclusive.

4. The resin system according to claim 1, wherein the resin system comprises at least 40 wt. % nanoparticles based on the total weight of the reactive component and the surface-modified nanoparticles.

5. The resin system according to claim 1, wherein the resin component comprises a curable resin.

6. The resin system according to claim 5, wherein the curable resin comprises an epoxy resin.

7. The resin system according to claim 1, wherein the resin component further comprises a reactive diluent.

8. The resin system according to claim 1, wherein the resin component has a complex viscosity of less than 100 Pa·s at 30° C. as measured according to the Rheology Test Procedure.

9. The resin system according to claim 1, wherein the resin system comprises at least 30 wt. % nanoparticles based on the total weight of the resin component and the nanoparticles, and a dispersion of the nanoparticles in the resin component has a complex viscosity of less than 60 Pa·s at 30° C. as measured according to the Rheology Test Procedure.

10. The resin system according to claim 1, wherein the nanoparticles comprise nanoparticles having a core with a silica surface.

11. The resin system of claim 10, wherein the nanoparticles comprise at least one surface modifying agent comprising a first group covalently bonded to the silica surface and a second group reactive with at least one constituent of the resin component.

12. The resin system according to claim 1, wherein the resin system comprises less than 0.5 percent by weight solvent.

13. An article comprising the resin system according to claim 1, wherein the resin system is cured.

14. The article of claim 13, wherein the article is a composite comprising fibers impregnated with the resin system.

15. The article of claim 13, wherein the resin system is a coating on a surface of a substrate.

16. A resin system comprising a resin component and surface-modified nanoparticles dispersed in the resin component, wherein the surface-modified nanoparticles have a multimodal particle size distribution comprising a first mode having an average particle size of D1, wherein D1 is between 50 nanometers and 250 nanometers, inclusive, and a number of nanoparticles in the first mode, N1, and a second mode having an average particle size, D2, wherein D2 is less than 15 nanometers, and a number of nanoparticles in the second mode, N2; wherein the ratio of D1 over D2 is greater than 10, and the ratio of N2 over N1 is between 1.5 and 100, inclusive;

wherein the average particle size and number of nanoparticles in a mode are measured according to the Transmission Electron Microscopy Procedure.

\* \* \* \* \*

UNITED STATES PATENT AND TRADEMARK OFFICE
CERTIFICATE OF CORRECTION

PATENT NO. : 8,871,853 B2
APPLICATION NO. : 13/578277
DATED : October 28, 2014
INVENTOR(S) : Kristin Thunhorst It is certified that error appears in the above-identified patent and that said Letters Patent is hereby corrected as shown below:

In The Drawings

Sheet 5 of 9
Last Line, delete "Number fraction" and insert -- Fraction of Number --, therefor.

In The Specification

Column 3
Line 44, delete "bismalimides" and insert -- bismaleimides --, therefor.
Line 52, delete "alicylic," and insert -- alicyclic, --, therefor.

Column 4
Line 14, delete "digycidal" and insert -- diglycidyl --, therefor.
Line 41, delete "trimethyol" and insert -- trimethyl --, therefor.
Line 42, delete "trigylcidyl" and insert -- triglycidyl --, therefor.

Column 7
Equation (3), delete "$NF2/NF1=(N2/(N1+N2))/(N1/(N1+N2)=N2/N1$" and insert
-- $NF2/NF1=(N2/(N1+N2))/(N1/(N1+N2))=N2/N1$ --, therefor.

Column 11
Line 16, delete "2009)," and insert -- 2009; Attorney Docket No. 65150US002), --, therefor.

Column 13
Line 5, delete "rotorevapotor" and insert -- rotavapor --, therefor.
Line 66, delete "Vicon-type" and insert -- Viscon-type --, therefor.

Column 18
Line 48, delete "stacking" and insert -- stacking. --, therefor.

Signed and Sealed this
Fourteenth Day of June, 2016

Michelle K. Lee
*Director of the United States Patent and Trademark Office*